(12) United States Patent
Bojappa et al.

(10) Patent No.: US 10,024,760 B2
(45) Date of Patent: Jul. 17, 2018

(54) METHODS FOR MONITORING TURBINE COMPONENTS

(71) Applicant: General Electric Company, Schenectady, NY (US)

(72) Inventors: Parvangada Ganapathy Bojappa, Simpsonville, SC (US); Jason Lee Burnside, Greenville, SC (US); Gregory Lee Hovis, Martinez, GA (US); William Farris Ranson, Columbia, SC (US); Jacob Andrew Salm, Greenville, SC (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 14/972,202

(22) Filed: Dec. 17, 2015

(65) Prior Publication Data

US 2017/0176291 A1     Jun. 22, 2017

(51) Int. Cl.
*G01M 15/14*     (2006.01)
*G01B 11/24*     (2006.01)

(52) U.S. Cl.
CPC ............ *G01M 15/14* (2013.01); *G01B 11/24* (2013.01)

(58) Field of Classification Search
CPC ...... G01M 15/14; F01D 21/003; G01B 11/24; G01B 11/14; G01B 15/00
See application file for complete search history.

(56) References Cited

U.S. PATENT DOCUMENTS

| | | | |
|---|---|---|---|
| 5,238,366 A | 8/1993 | Ferleger | |
| 6,389,158 B1* | 5/2002 | Pettersen | G01B 11/002 382/152 |
| 6,807,870 B2 | 10/2004 | Kondo et al. | |
| 6,983,659 B2 | 1/2006 | Soechting et al. | |
| 7,333,218 B2* | 2/2008 | Vaidyanathan | B23P 6/002 356/608 |
| 7,493,809 B1* | 2/2009 | Ward, Jr. | G01M 5/0016 73/168 |
| 7,552,647 B2 | 6/2009 | Soechting et al. | |
| 7,712,553 B2 | 5/2010 | Shamburger | |
| 8,593,296 B2 | 11/2013 | Pg et al. | |
| 8,760,447 B2* | 6/2014 | Bendall | G06T 7/0004 345/419 |
| 9,348,001 B2* | 5/2016 | Reid | G01N 27/90 |
| 9,410,868 B2* | 8/2016 | Ward, Jr. | B23K 26/364 |
| 9,546,928 B2* | 1/2017 | Ward, Jr. | C23C 4/11 |
| 9,835,440 B2* | 12/2017 | Hovis | G01B 11/14 |
| 2007/0019213 A1 | 1/2007 | Vaidyanathan | |
| 2010/0121606 A1 | 5/2010 | Vestergaard | |
| 2010/0183191 A1 | 7/2010 | Wieneke | |

(Continued)

OTHER PUBLICATIONS

Extended European Search Report and Opinion issued in connection with corresponding EP Application No. 16204619.7 dated Apr. 26, 2017.

*Primary Examiner* — Freddie Kirkland, III
(74) *Attorney, Agent, or Firm* — Charlotte C. Wilson; Ernest G. Cusick; Frank A. Landgraff

(57) ABSTRACT

Methods for monitoring a components include locating a plurality of machined surface features on the component, locating at least one reference point, and measuring a plurality of first distances between the plurality of machined surface features and the at least one reference point.

9 Claims, 5 Drawing Sheets

(56) References Cited

U.S. PATENT DOCUMENTS

| | | |
|---|---|---|
| 2011/0210961 A1* | 9/2011 | Bendall ................ G06T 7/0004 |
| | | 345/419 |
| 2011/0299738 A1 | 12/2011 | Wieneke |
| 2012/0223937 A1 | 9/2012 | Bendall |
| 2013/0202192 A1 | 8/2013 | Telfer et al. |
| 2014/0000380 A1* | 1/2014 | Slowik ..................... G01L 1/24 |
| | | 73/800 |
| 2015/0107341 A1* | 4/2015 | Reid ..................... G01N 27/90 |
| | | 73/112.01 |
| 2015/0170412 A1* | 6/2015 | Bendall ................... G06T 17/00 |
| | | 382/119 |
| 2015/0219451 A1* | 8/2015 | Pettersson .............. G01B 5/008 |
| | | 33/503 |
| 2015/0346058 A1 | 12/2015 | Ward, Jr. et al. |
| 2017/0180679 A1 | 6/2017 | Ozturk et al. |

* cited by examiner

METHODS FOR MONITORING TURBINE COMPONENTS

BACKGROUND OF THE INVENTION

The subject matter disclosed herein relates to components, more specifically, to monitoring components using reference surface features such as machined surface features or naturally occurring surface features.

Some components may need to operate in environments comprising elevated temperatures and/or corrosive conditions. For example, turbomachines are widely utilized in fields such as power generation and aircraft engines. Such gas turbine systems include a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures may depend in part one or more protective coatings and/or on supplying a cooling air to the outer surfaces of the metal parts through various methods. The metal parts of these engines that are particularly subject to high temperatures, and thus require particular attention with respect to cooling, are the metal parts forming combustors and parts located aft of the combustor.

Moreover, these and other components may experience stress and/or strain from various forces over its operational lifecycle. While various tools may be utilized to measure imparted stress and strain in relatively standard environments, turbine and other components in may experience various forces across a variety of locations as opposed to at a single point or along a linear path.

Accordingly, alternative components with array-based strain sensors and methods for monitoring the same would be welcome in the art.

BRIEF DESCRIPTION OF THE INVENTION

In one embodiment, a method for monitoring a component is disclosed. The method can include locating a plurality of machined surface features on the component, locating at least one reference point, and measuring a plurality of first distances between the plurality of machined surface features and the at least one reference point.

In another embodiment, another method for monitoring a turbine component is disclosed. The method can include locating a plurality of machined surface features on the turbine component, locating at least one reference point, and measuring a plurality of first distances between the plurality of machined surface features and the at least one reference point. The method can further include using the turbine component in a turbomachine, locating the plurality of machined surface features on the turbine component at a second point in time after the turbine component was used in the turbomachine, locating the at least one reference point at the second point in time, measuring a plurality of second distances between the plurality of machined surface features and the at least one reference point at the second point in time, and comparing the plurality of first distances to the plurality of second distances to determine a strain analysis.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
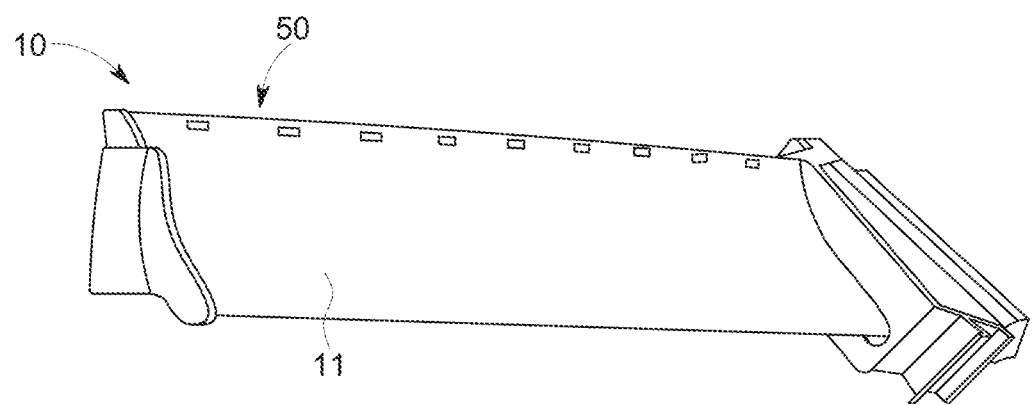
FIG. 1 is an exemplary component comprising reference surface features according to one or more embodiments shown or described herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Referring now to FIGS. 1-6, a component 10 generally comprises a surface 11 and a plurality of reference surface features 50 and at least one reference point 60 (which itself may comprise one of the reference surface features 50) on the surface 11 of the component 10. As will become better appreciated herein, the reference surface features 50 may comprise machined surface features 51 (e.g., cooling holes on a turbine component, machined contours, dimples, scribes, indents, edges or the like) and/or naturally occurring surface features 52 (e.g., grain structures, surface topography features or the like). The reference surface features 50 can help facilitate determinations of strain, strain rate, creep, fatigue, stress, etc. across that region of the component 10 without the addition of separate strain sensor related components.

The component 10 (and more specifically the substrate 11 of the overall component 10) can comprise a variety of types of components used in a variety of different applications, such as, for example, components utilized in high temperature applications (e.g., components comprising nickel or cobalt based superalloys). In some embodiments, the component 10 may comprise an industrial gas turbine or steam turbine component such as a combustion component or hot gas path component. In some embodiments, the component 10 may comprise a turbine blade, compressor blade, vane, nozzle, shroud, rotor, transition piece or casing. In other embodiments, the component 10 may comprise any other component of a turbine such as any other component for a gas turbine, steam turbine or the like. In some embodiments, the component may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

Referring still to FIGS. 1-6, the reference surface features 50 on the component may comprise machined surface features 51 and/or naturally occurring surface features 52.

Figure 2:
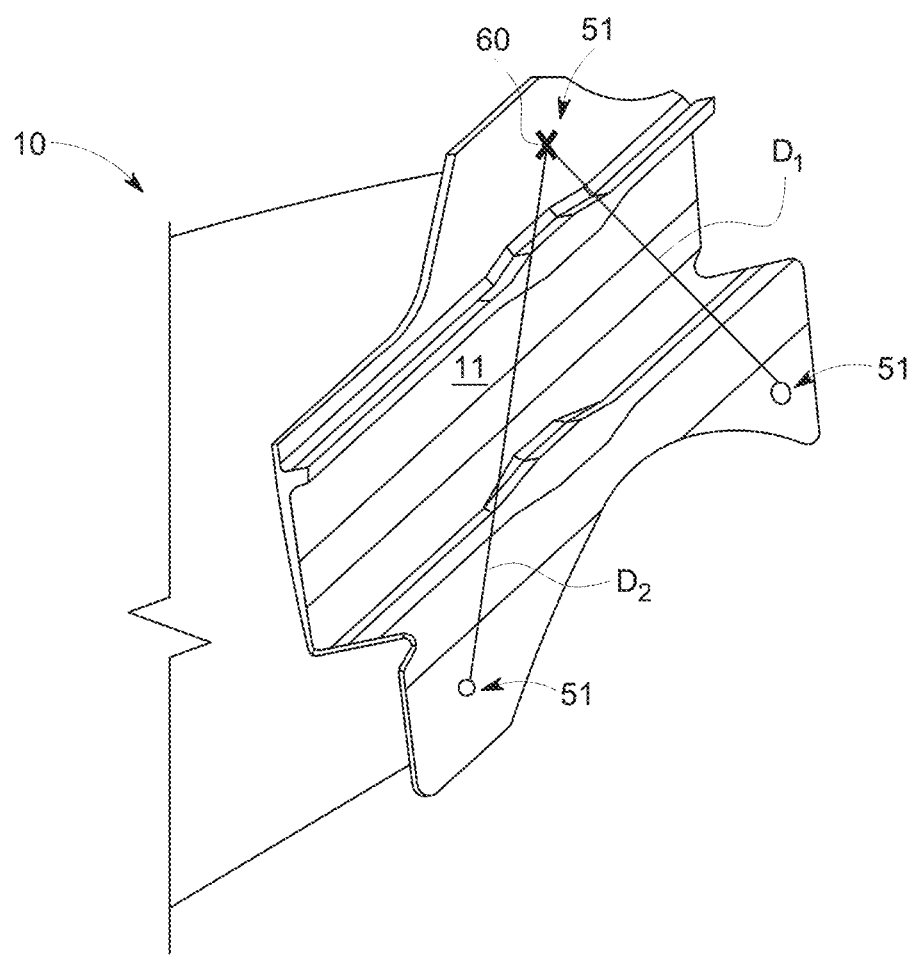
FIG. 2 is perspective view of a portion of the component illustrated in FIG. 1 comprising machined surface features according to one or more embodiments shown or described herein.

As best illustrated in FIG. 2, machined surface features 51 can comprise any macroscopic identifiable feature that is machined into the component 10. As used herein, "machined" can broadly include any deposition, additive manufacturing, subtractive or appearance changing techniques including, for example, casting, shot or dot peening, lasering (adding or removing), scribing, drilling, engraving, annealing, discoloring, polishing, resurfacing or otherwise adding, removing or altering material via one or more operations into, from or on the component 10. The machined surface features 51 can comprise functional or non-functional features and can be added to the component 10 at any stage including initial manufacturing or service interval.

In some embodiments, the machined surface features 51 can comprise a dimple, divot, hole, indent, scribe or other form of material removal from the component 10. In some embodiments, the machined surface features 51 can comprise a bump, raised feature, or other form of material addition to the component 10. In some embodiments, the machined surface features 51 may comprise a contour in the component 10 such as a corner, joint, edge, ridge or the like.

As discussed above, the component 10 may comprise a turbine component or other type of component for high temperature applications. In such embodiments, the machined surface features 51 may comprise cooling holes in the component 10.

Figure 3:
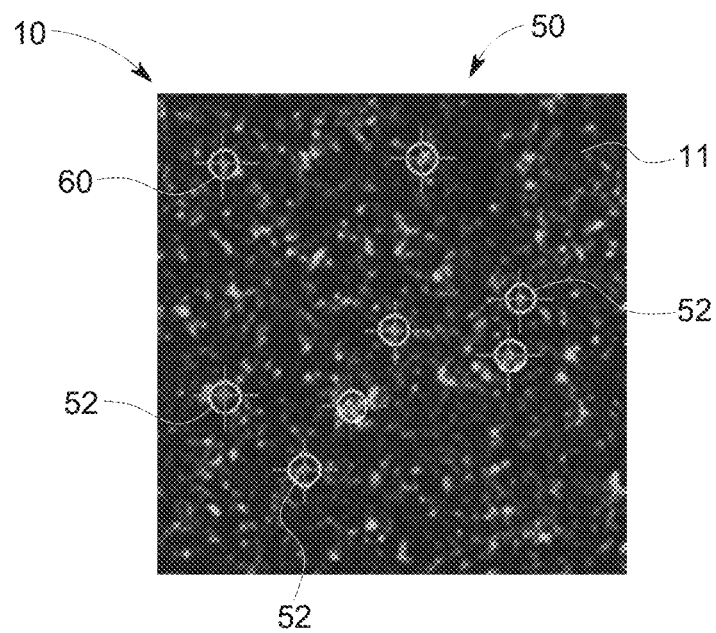
FIG. 3 is magnified view of a portion of the component illustrated in FIG. 1 comprising naturally occurring surface features according to one or more embodiments shown or described herein.
Figure 4:
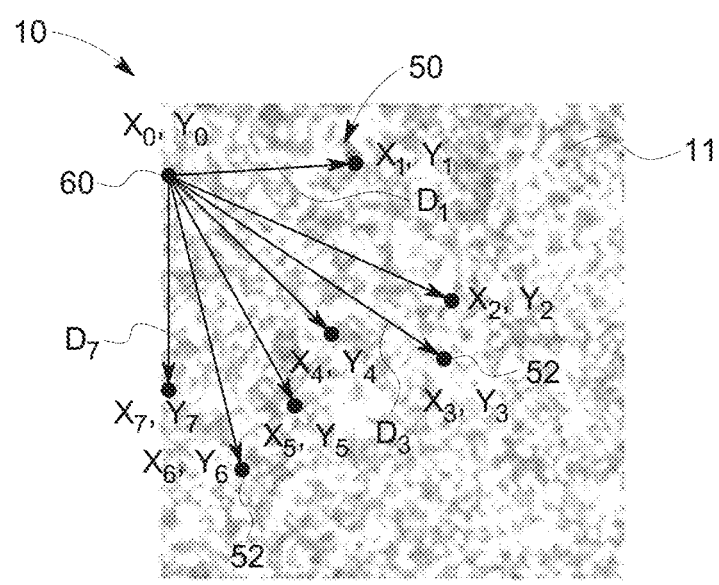
FIG. 4 is magnified view of a portion of the component illustrated in FIG. 1 illustrating distances between naturally occurring surface features and a reference point according to one or more embodiments shown or described herein.

As best illustrated in FIGS. 3-4, naturally occurring surface features 52 can comprise any feature, including microscopic features (e.g., diameters less than 500 or even 100 microns), which are naturally occurring on the component 10. For example, naturally occurring surface features 52 can comprise grain structures of the material itself and/or marks caused by material fabrication and/or finishing methods such as, but not limited to, cutting, extruding, rolling, casting, heat treating, grit blasting, cleaning, etching or the like. In some embodiments, naturally occurring surface features 52 can comprise surface topography features such as naturally occurring surface roughness with a plurality of peaks and valleys.

With reference to FIGS. 2 and 4, the component 10 can further comprise at least one reference point 60. The reference point 60 can include any identifiable point on the component 10 that can be used to measure a plurality of distances between the at least one reference point 60 and one or more reference surface features 50 of the component 10. In some embodiments, the reference point 60 may comprise one of the reference surface features 50 (e.g., a machined surface feature 51 or a naturally occurring surface feature 52). In some embodiments, the reference point 60 may comprise any other feature such as a deposited material, paint, stake or the like. Furthermore, in some embodiments, the reference point 60 may be disposed in areas less likely to experience distortion, wear, oxidization or the like (e.g., the dovetail on a turbine component). Such embodiments may help facilitate future readings (including bulk inspection readings that may even be taken in-situ an overall machine) by providing a more consistent reference location from which to measure relative movement of the other reference surface features 50.

The plurality of reference surface features 50 (e.g., machined surface features 51 and/or naturally occurring surface features 52) and the at least one reference point 60 may be located via an suitable imaging methods depending on, for example, the type, material, size and shape of the component and/or the type of reference surface feature 50.

For example, in some embodiments, such as when the reference surface features 50 comprise machined surface features 51 of macroscopic scale, the plurality of reference surface features 50 may be located using a structured light scan such as blue light or white lite. In some embodiments, the reference surface features 50 may be located by identifying a 3-dimensional coordinate location for each of the reference surface features 50. In such embodiments, various 3-dimensional imaging techniques may be utilized such as CAT scans or laser topography analysis.

In some embodiments, such as when the reference surface features 50 comprise naturally occurring surface features 52, the plurality of reference surface features 50 may be located via microscopic imaging techniques (e.g., optical, SEM, TEM, AFM or the like). In some embodiments, the plurality of reference surface features 50 may be located by identifying a 2-dimensional coordinate location (e.g., $X_{\#}, Y_{\#}$ as illustrated in FIG. 4) for each of the reference surface features 50.

As best illustrated in FIG. 3, in some embodiments, the plurality of reference surface features 50 may be located by determining a centroid for each of the reference surface features 50. A centroid in accordance with the present disclosure is a geometric center of a region, such as a two-dimensional region, and is thus the arithmetic mean or average position of all points in the shape. In exemplary embodiments, a centroid may be located through use of the imaging device and processor. In such embodiments, the processor, in analyzing an image of, for example, a plurality of reference surface features 50, may calculate and thus locate the centroid of each of the plurality of reference surface features 50.

Figure 5:
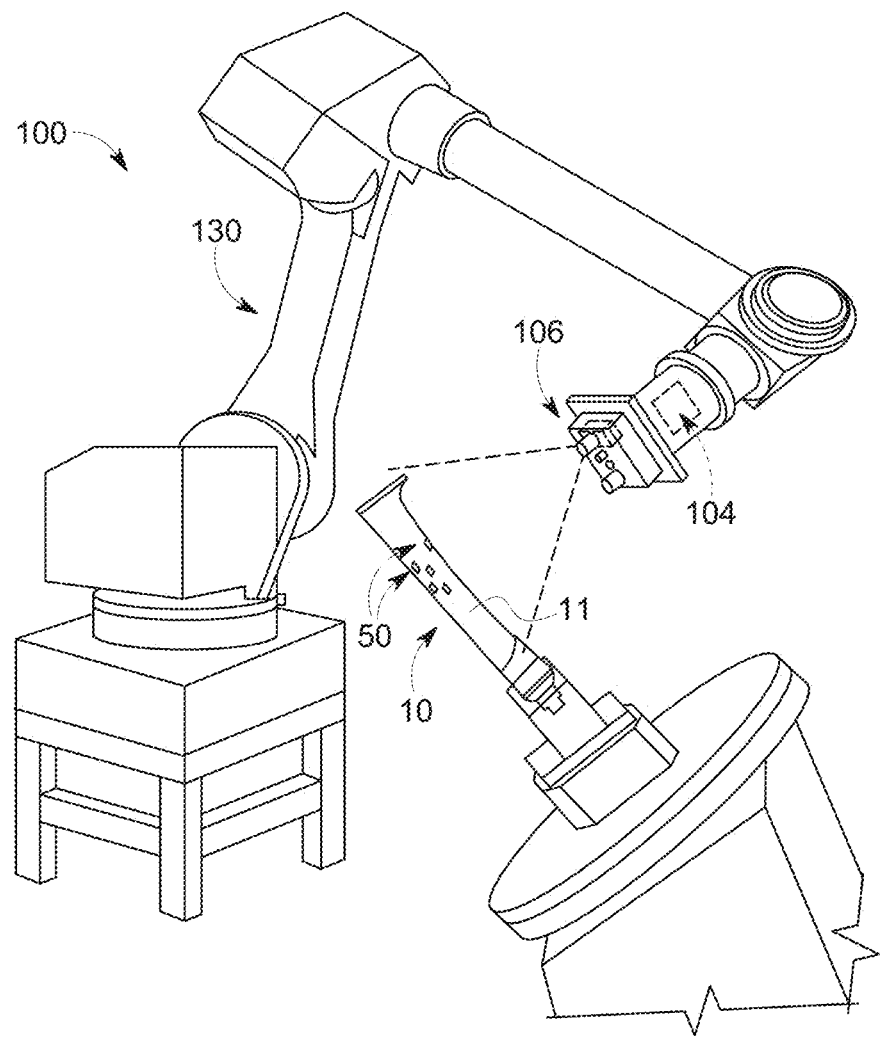
FIG. 5 is a perspective view of a system for locating reference surface features on a component.
Figure 6:
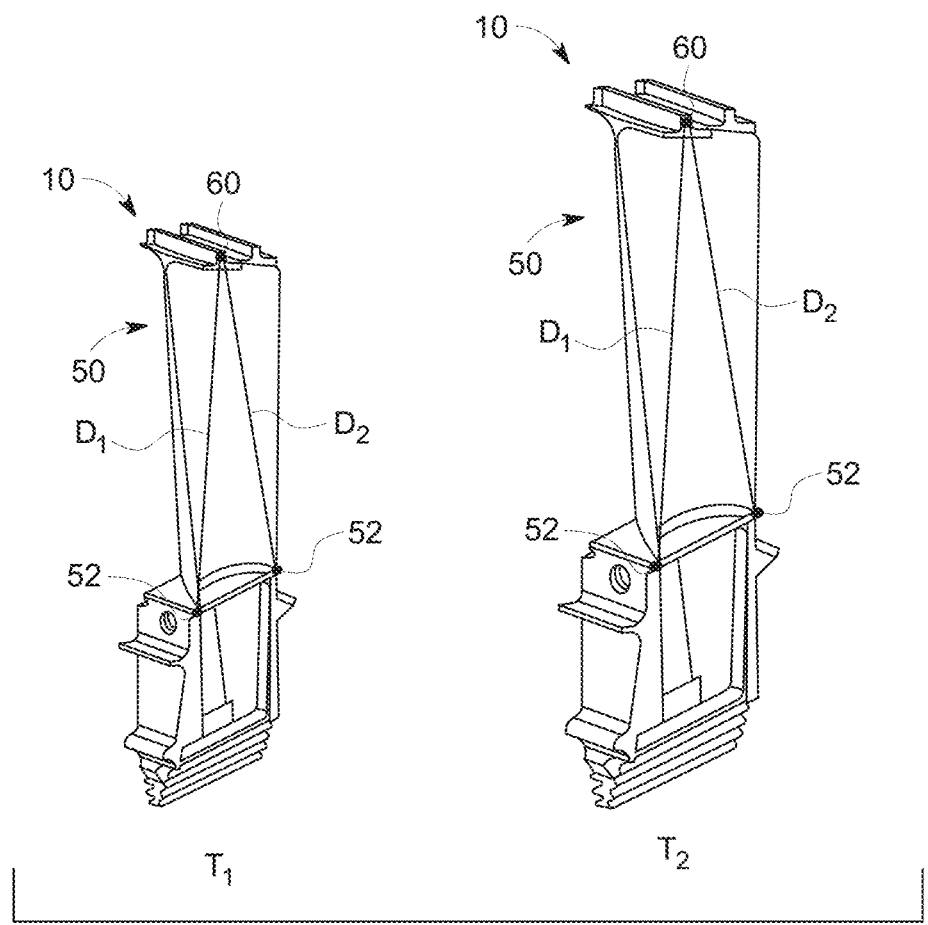
FIG. 6 is a perspective view of a component comprising reference surface features at two different time intervals according to one or more embodiments shown or described herein; and, FIG. 7 is an exemplary method for monitoring a component with reference surface features according to one or more embodiments shown or described herein.

Referring now to FIGS. 2 and 5, a system 100 may be utilized to locate the plurality of reference surface features 50 and/or the at least one reference point 60 on the component 10 as described herein. Such an exemplary system 100 may include, for example, an imaging device 106 and a processor 104.

The processor 104 may generally analyze data captured from the imaging device 106 and perform various calculations and other functions as discussed herein. In particular, systems 100 in accordance with the present disclosure may provide accurate and efficient detection of the plurality of reference surface features 50 relative to the turbine component 10.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Processor 104 may also include various input/output channels for receiving inputs from and sending control signals to various other components with which the processor 104 is in communication, such as the imaging device 106, data acquisition device, robotic arm (discussed herein), etc. Processor 104 may generally perform various steps as discussed herein. Further, it should be understood that a processor 104 in accordance with the present disclosure may be a single master processor 104 in communication with the other various components of system 100, and/or may include a plurality of individual component processors, i.e. an imaging device processor, a data acquisition device processor, a robotic arm processor, etc. The various individual component processors may be in communication with each other and may further be in communication with a master processor, and these components may collectively be referred to as processor 104.

The system 100 can further include an imaging device 106 for obtaining an image of the turbine component 10. For example, imaging device 106 may include a lens assembly and an image capture device. The lens assembly may generally magnify images viewed by the imaging device. For example, the lens assembly in some embodiments may, for example, be a suitable camera lens, telescope lens, etc., and may include one or more lenses spaced apart to provide the required magnification. An image capture device may generally be in communication with the lens assembly for receiving and processing light from the lens assembly to generate images. In exemplary embodiments, for example, image capture device may be a camera sensor which receives and processes light from a camera lens to generate images, such as digital images, as is generally understood. The imaging device 106 may further be in communication with processor 104, via for example a suitable wired or wireless connection, for storing and analyzing the images from the imaging device 106. Notably, in exemplary embodiments processor 104 performs and operates imaging devices 106 to perform various steps or operations disclosed herein.

As further illustrated in FIG. 5, the system 100 may further include a robotic arm 130. The robotic arm 130 may support and facilitate movement of other components of system 100, such as components of the imaging device 106 and the processor 104. For example, the imaging device 106 may be mounted to the robotic arm 130. Processor 104 may be in communication with the robotic arm 130, such as with the various motors and/or drive components thereof, and may actuate the robotic arm 130 to move as required. Such movement may, in exemplary embodiments, position the imaging device 106 relative to the component 10. In exemplary embodiments, the robotic arm 130 is a six-degree-of-freedom arm 130 which provides movement along 3 separate axes and along three separate angles (about the respective axes).

Referring now to FIGS. 2 and 4, once the plurality of reference surface features 50 (e.g., machined surface features 51 and/or naturally occurring surface features 52) and the at least one reference point 60 are located, a plurality of distances D may be measured between the plurality of reference surface features 50 and the at least one reference point 60 may be measured. These distances may then be re-measured at later times (e.g., before, during and after the component was utilized) to be compared to analyze strain, strain rate, creep, fatigue, stress, etc. across that region of the component 10. For example, the comparison may be utilized to create a strain map illustrating the changes in distances D.

Figure 7:
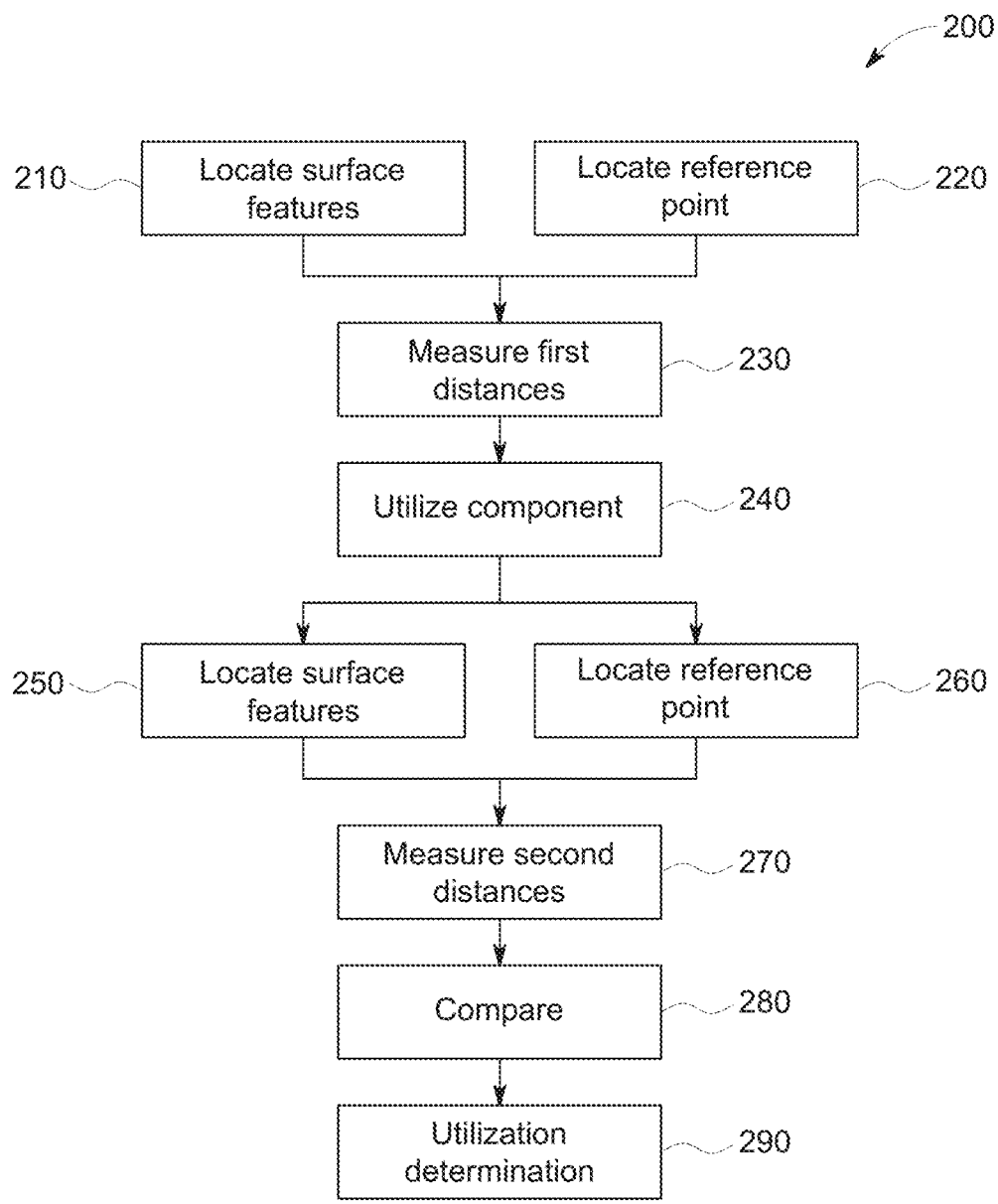

With additional reference to FIG. 7, a method 200 is illustrated for monitoring a component 10 such as a turbine component as illustrated in FIGS. 1-6. The method 200 first comprises locating the plurality of reference surface features 50 (e.g., machined surface features 51 and/or naturally occurring surface features 52) in step 210 and locating at least one reference point 60 in step 220. The plurality of reference surface features 50 the at least one reference point 60 may comprise any suitable feature and located via and suitable methodology as disclosed herein. It should be appreciated that steps 210 and 220 may also occur in any relative order and/or occur simultaneously.

Method 200 may then further comprise measuring a plurality of first distances D between the plurality of reference surface features 50 (e.g., machined surface features 51 and/or naturally occurring surface features 52) and the at least one reference point 60 in step 230. These distances D may be stored for reference as should be appreciated herein. For example, in some embodiments, the distances D measured in step 230 may be used for strain analysis when prior distances D have previously been measured or already known.

In some embodiments, the method 200 may further comprise utilizing the component in step 240 after the plurality of first distances D were measured in step 230. In these and other embodiments, method 200 may then further comprise a repetitive distance measurement process mirroring steps 210, 220 and 230 such that new distances between the same respective reference surface features 50 and reference point (s) 60 may be determined. Specifically, method 200 may further comprise locating the plurality of reference surface features 50 (e.g., machined surface features 51 and/or naturally occurring surface features 52) at a second point in time (i.e., after steps 210) in step 250 and locating at least one reference point 60 at the second point in time in step 260. As before, it should be appreciated that steps 210 and 220 may also occur in any relative order and/or occur simultaneously.

Method 200 may then further comprise measuring a plurality of second distances D between the plurality of reference surface features 50 (e.g., machined surface features 51 and/or naturally occurring surface features 52) and the at least one reference point 60 at the second point in time in step 270.

Method 200 may also comprise comparing the plurality of first distances D (from the first point in time) to the plurality of second distances D (from the second point in time) to determine a strain analysis in step 280. The strain analysis in step 280 may comprise any comparison of distances between the plurality of reference surface features 50 and the reference point 60 from the first and second points in time. For example, the strain analysis in step 280 may comprise an analysis of strain, strain rate, creep, fatigue, stress, etc. across that region of the component 10 such as by producing a strain map illustrating changes in distances D.

Finally, in some embodiments, method 200 may comprise making a utilization determination of the component 10 in step 290 based on the comparison in step 280, such as, for example, continuing to utilize the component 10 based on the strain analysis, modify or repair the component 10 based on the strain analysis, or scrap the component 10 based on the strain analysis.

It should now be appreciated that reference surface features, including both machined surface features and naturally occurring surface features, may be located on components for monitoring strain, creep or the like particular areas of the component. The utilization of reference surface features may streamline the strain monitoring process by limiting or avoiding the requirement of additional sensor material. This information may then be utilized to determine any necessary modifications to the component or verify its suitability for future use.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for assessing strain in a turbine component, the method comprising:
    locating a plurality of surface features on the turbine component at a first point in time, a first surface feature of the plurality of surface features being a machined surface feature and a second surface feature of the plurality of surface features being a naturally occurring surface feature;
    locating at least one reference point at the first point in time;
    measuring, at the first point in time, a plurality of first distances between the plurality of surface features and the at least one reference point;
    using the turbine component in a turbomachine;
    locating, on the turbine component, the plurality of surface features including the first surface feature and the second surface feature at a second point in time after using the turbine component in the turbomachine;
    locating the at least one reference point at the second point in time;
    measuring a plurality of second distances between the plurality of surface features and the at least one reference point at the second point in time; and
    comparing the plurality of first distances to the plurality of second distances to monitor and determine a strain analysis of the turbine component.

2. The method of claim 1, further comprising continuing to use the turbine component in the turbomachine based on the strain analysis.

3. The method of claim 1, wherein the first surface feature comprises a cooling hole.

4. The method of claim 1, wherein the first surface feature comprises a component contour.

5. The method of claim 1, wherein the at least one reference point comprises one of the plurality of surface features.

6. The method of claim 1, wherein locating the plurality of surface features comprises assigning a 3-dimensional coordinate location for each of the plurality of surface features.

7. The method of claim 1, wherein locating the plurality of surface features comprises using a structured light scan of the component.

8. The method of claim 1, wherein comparing the plurality of first distances to the plurality of second distances further comprises producing a strain map illustrating changes in the plurality of first and second distances.

9. The method of claim 1, wherein the turbine component is one of a turbine blade, a compressor blade, a vane, a nozzle, a shroud, a transition piece, and a casing.

* * * * *